United States Patent
Wu

(10) Patent No.: US 10,244,266 B1
(45) Date of Patent: Mar. 26, 2019

(54) NOISY MEDIA CONTENT ENCODING

(71) Applicant: Amazon Technologies, Inc., Seattle, WA (US)

(72) Inventor: Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 377 days.

(21) Appl. No.: 15/041,590

(22) Filed: Feb. 11, 2016

(51) Int. Cl.
| | | |
|---|---|---|
| *H04B 1/66* | (2006.01) | |
| *H04N 19/86* | (2014.01) | |
| *H04N 19/625* | (2014.01) | |
| *H04N 19/124* | (2014.01) | |
| *H04N 19/136* | (2014.01) | |
| *H04N 19/18* | (2014.01) | |
| *H04N 19/172* | (2014.01) | |
| *H04N 19/122* | (2014.01) | |
| *H04N 19/176* | (2014.01) | |

(52) U.S. Cl.
CPC ........... *H04N 19/86* (2014.11); *H04N 19/122* (2014.11); *H04N 19/124* (2014.11); *H04N 19/136* (2014.11); *H04N 19/172* (2014.11); *H04N 19/176* (2014.11); *H04N 19/18* (2014.11); *H04N 19/625* (2014.11)

(58) Field of Classification Search
CPC .... H04N 19/14; H04N 19/176; H04N 19/124; H04N 21/2353; H04N 21/2389
USPC ...................................................... 375/240.2
See application file for complete search history.

(56) References Cited

U.S. PATENT DOCUMENTS

| | | | | |
|---|---|---|---|---|
| 7,711,044 | B1 * | 5/2010 | Hoang ................ | H04N 19/147 375/240 |
| 2007/0025447 | A1 * | 2/2007 | Kojokaro ............ | H04N 19/139 375/240.24 |
| 2009/0046778 | A1 | 2/2009 | Lee et al. | |
| 2009/0310672 | A1 | 12/2009 | Rao et al. | |
| 2013/0051457 | A1 | 2/2013 | Joshi et al. | |
| 2013/0330012 | A1 | 12/2013 | Sato | |
| 2015/0071363 | A1 | 3/2015 | Sun et al. | |
| 2015/0215621 | A1 | 6/2015 | Liu et al. | |

OTHER PUBLICATIONS

U.S. Appl. No. 15/041,606, filed Feb. 11, 2016, Wu.
U.S. Office Action dated Oct. 6, 2017 issued in U.S. Appl. No. 15/041,606.
U.S. Final Office Action dated Apr. 26, 2018 issued in U.S. Appl. No. 15/041,606.

* cited by examiner

*Primary Examiner* — Frederick D Bailey
*Assistant Examiner* — Masum Billah
(74) *Attorney, Agent, or Firm* — Weaver Austin Villeneuve & Sampson LLP

(57) ABSTRACT

Techniques are described for encoding noisy media content. A residual coefficient matrix representing differences in image content between a portion of a target image frame and portions of one or more reference frames can include noise within a high frequency band. Some of the noise can be removed by removing isolated residual coefficients under some estimated threshold. Additionally, the remaining noise can be reduced by attenuating their values selectively.

18 Claims, 7 Drawing Sheets

NOISY MEDIA CONTENT ENCODING

CROSS-REFERENCE TO RELATED APPLICATIONS

This disclosure is related to U.S. patent application Ser. No. 15/041,606, titled NOISY MEDIA CONTENT ENCODING and filed on the same day as the present patent application and incorporated by reference herein and for all purposes.

BACKGROUND

Consumers have an ever-increasing array of options for consuming media content, in terms of the types of media content (e.g., video, audio, text, etc.), providers of the media content, and devices for consuming media content. Media content providers are becoming increasingly sophisticated and effective at providing media content quickly and reliably to consumers.

Media content is typically encoded, which includes using compression algorithms to reduce the number of bits needed to transmit the media content to a viewer's device where it is decoded for playback. Unfortunately, noisy media content can be difficult to encode, especially when noise can't be removed in a pre-processing stage.

DETAILED DESCRIPTION

Figure 1:
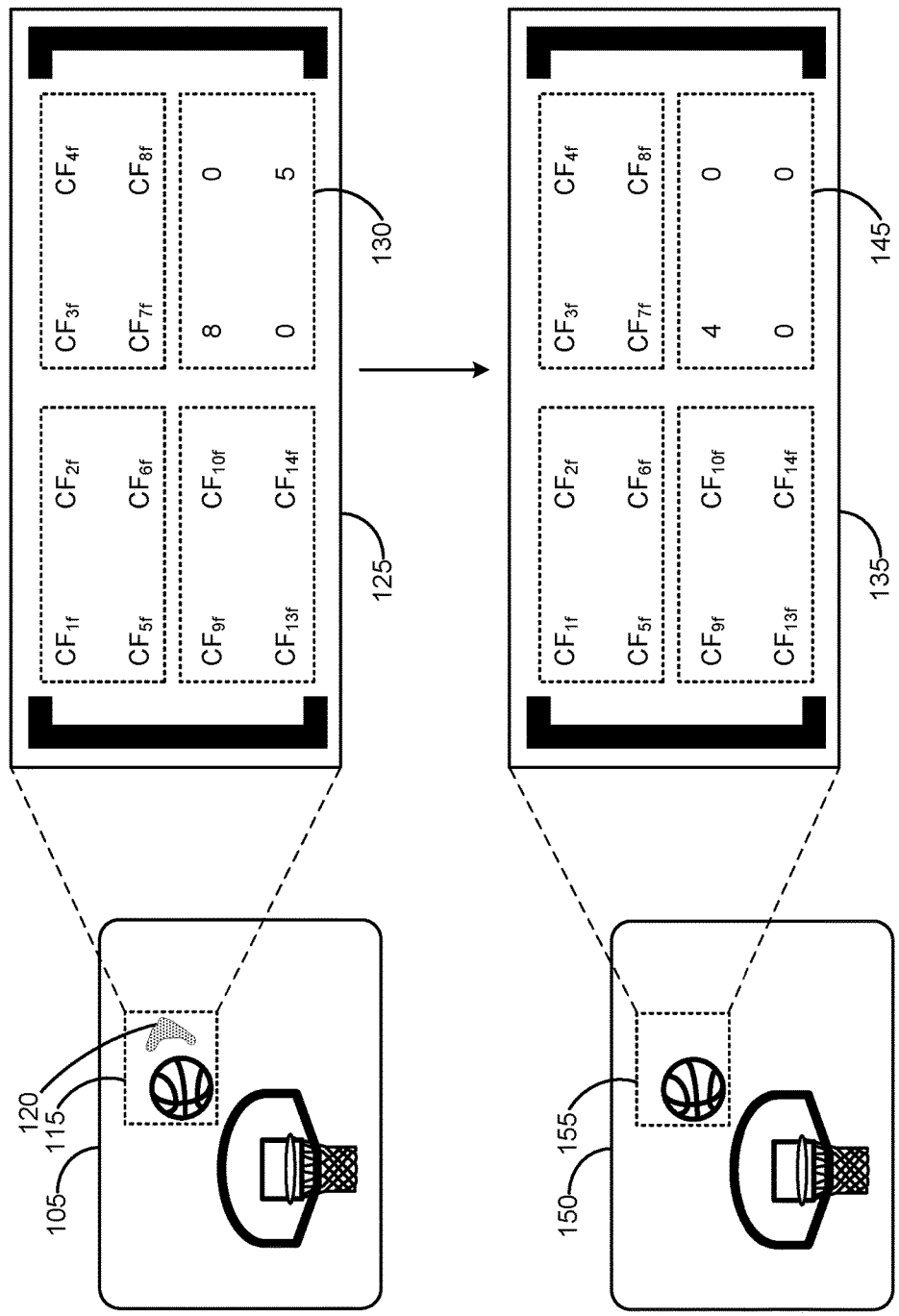
FIG. 1 illustrates an example of encoding media content with removal of isolated non-zero high frequency residual coefficients and attenuation of high frequency residual coefficients.

This disclosure describes media content encoding techniques for reducing noise of media content. For example, in some standards such as High Efficiency Video Coding (HEVC)/H.265, media content (e.g., movies, television shows, videos, etc.) is encoded, resulting in a compressed bitstream representing a version of that media content. The encoding process includes determining residual coefficients representing kept differences in image content between a portion (e.g., an M×N block of pixels for a coding unit) of a target image frame and corresponding portions of reference frames. If the portion of the target frame or reference frame includes noise, then some of the residual coefficients also incorporate that noise. This results in some bits being used to represent noise rather than meaningful image content. Moreover, if the noise was not present, fewer bits could be used to encode the media content, resulting in a more efficient compression technique.

In some implementations, an encoder reduces the number of bits being used to represent noise by applying a Discrete Cosine Transform (DCT) to transform the residual coefficients from the spatial domain to the frequency domain. Noise is often concentrated within the high frequency bands. The encoder analyzes the high frequency residual components and compares their values to an estimated noise level of the portion of the target frame. If a residual coefficient is a non-zero value that is isolated from other residual coefficients by zero value residual coefficients and its value is beneath a noise level threshold, then the non-zero value residual coefficient is modified to be a zero value residual coefficient. Remaining high frequency residual components can be attenuated by applying a custom quantization matrix that can be used to reduce their values. As a result, high frequency residual coefficients due to noise can be eliminated or reduced, and therefore, compressed into fewer bits during encoding.

This disclosure also describes media content encoding techniques for improving the visual quality of media content that includes noise. For example, in standards such as HEVC, an image frame is segmented into coding tree units (CTUs) which can be further partitioned into coding units (CUs). The CUs can further be partitioned into prediction units (PUs). The residual coefficients for a portion of an image frame are determined for each CU. Different CUs in the image frame can be different sizes, for example, some might be 4×4 pixels, some might be 8×8 pixels, and so forth up to 64×64 pixels. During the encoding process, quantization parameters are applied to the residual coefficients of each portion of the frame to scale down the residual coefficients as a compression technique. However, if a much higher or lower quantization parameter is applied to the set of residual coefficients of one CU than another set of residual coefficients of another CU, then the quality of the different portions of the image frame can significantly vary, resulting in a noticeable flickering across the image frame when the media content is decoded and played back.

In some implementations, the encoder can reduce the differences in quality by constraining the quantization parameters allowed to be applied to the residual coefficients of the different portions. For example, the encoder determines the average quantization parameter for the portions (or CUs) in the image frame. A quantization parameter within a scale around the average (e.g., −3 to +3 of the average quantization parameter) can then be applied to the residual coefficients of each of the portions of the frame. As a result, the quantization parameter applied to different portions of the frame can be constrained around the average quantization parameter. This reduces the variance between the quantization parameters applied to the residual coefficients, which reduces the flickering across the image frame.

As an example, FIG. 1 illustrates encoding media content with removal of isolated non-zero high frequency residual coefficients and attenuation of high frequency residual coefficients. As shown in FIG. 1, image frame 105 is a frame of a video with portion 115 including noise 120. Residual coefficients 125 represent the differences in image content of portion 115 to corresponding portions in one or more reference frames. That is, residual coefficients 125 provide data that can be used by a decoder to reconstruct image frame 105 from reference frames. The illustration in FIG. 1 is a simplified example. In some implementations, portion 115 might be significantly smaller than shown, for example, on the order of 4×4, 8×8, 16×16, 32×32, or 64×64 pixels.

In FIG. 1, residual coefficients 125 are represented by a matrix with the coefficients in the frequency domain as the result of a Discrete Cosine Transform (DCT) applied to the residual coefficients in the spatial domain. The bottom-right portion of residual coefficients 125 includes high frequency residual coefficients 130. In video and image content, noise is often concentrated within high frequency residual coefficients 130. More meaningful content (e.g., the image data representing the basketball of portion 115 rather than noise 120) can be within the top-left portion of residual coefficients 125 (i.e., the low frequency), the top-right and bottom-left (i.e., the middle frequency), as well as possibly in the bottom-right high frequency residual coefficients 130. If residual coefficients in high frequency residual coefficients 130 are noise, then removing or attenuating them can result in fewer bits being needed to encode portion 115, or more bits can be spent to encode the low and middle frequency residual coefficients to allow for an increase in quality.

A noise module can determine whether portion 115 includes noise using noise detection techniques. If portion 115 includes noise, meaning that residual coefficients 125 likely includes noise within high frequency residual coefficients 130, and the noise module determines an estimate of the noise level of that noise, then an encoder can analyze and modify high frequency residual components 130 such that it needs less bits to be encoded. The encoder can either zero out a residual coefficient or attenuate (e.g., reduce) a value to reduce the number of bits needed to encode high frequency residual components 130.

High frequency residual coefficients 130 can be zeroed out (i.e., reduced from a non-zero value to a zero value) if they are isolated from other non-zero residual coefficients and are within a threshold noise level range. For example, in FIG. 1, the residual coefficient with the value of 5 within high frequency residual coefficient is isolated from $CF_{14f}$, the residual coefficient with the value of 8 within high frequency residual coefficients 130, and $CF_{8f}$ by zero value coefficients. Moreover, if the noise level of portion 115 is 10, then isolated high frequency residual coefficients that are within a threshold noise level range of half or less than the noise level (i.e., 5 or below) can be zeroed out. As a result, modified residual coefficients 135 include modified high frequency residual coefficients 145 with a 0 in the place of the 5 in high frequency residual coefficients 130. This results in fewer bits needed to encode high frequency residual coefficients 130.

High frequency residual coefficients 130 can also be attenuated (i.e., reduced or divided by a factor). For example, the remaining high frequency residual coefficients 130 can be attenuated by a factor by applying (e.g., multiplying) a custom quantization matrix, as discussed later, to residual coefficients 125 such that the remaining high frequency residual coefficients 130 are attenuated. In the example of FIG. 1, this results in the 8 value residual coefficient of high frequency residual coefficients 130 being attenuated to a 4 in modified high frequency residual coefficients 145 (i.e., reduced by half). This also results in fewer bits needed to encode high frequency residual coefficients 130.

As a result, portion 155 of encoded image frame 150 includes similar visual content as image frame 105 and portion 115, but without noise 120 due to the modification of the residual coefficients of high frequency residual coefficients 130 to high frequency residual coefficients 145.

Figure 2:
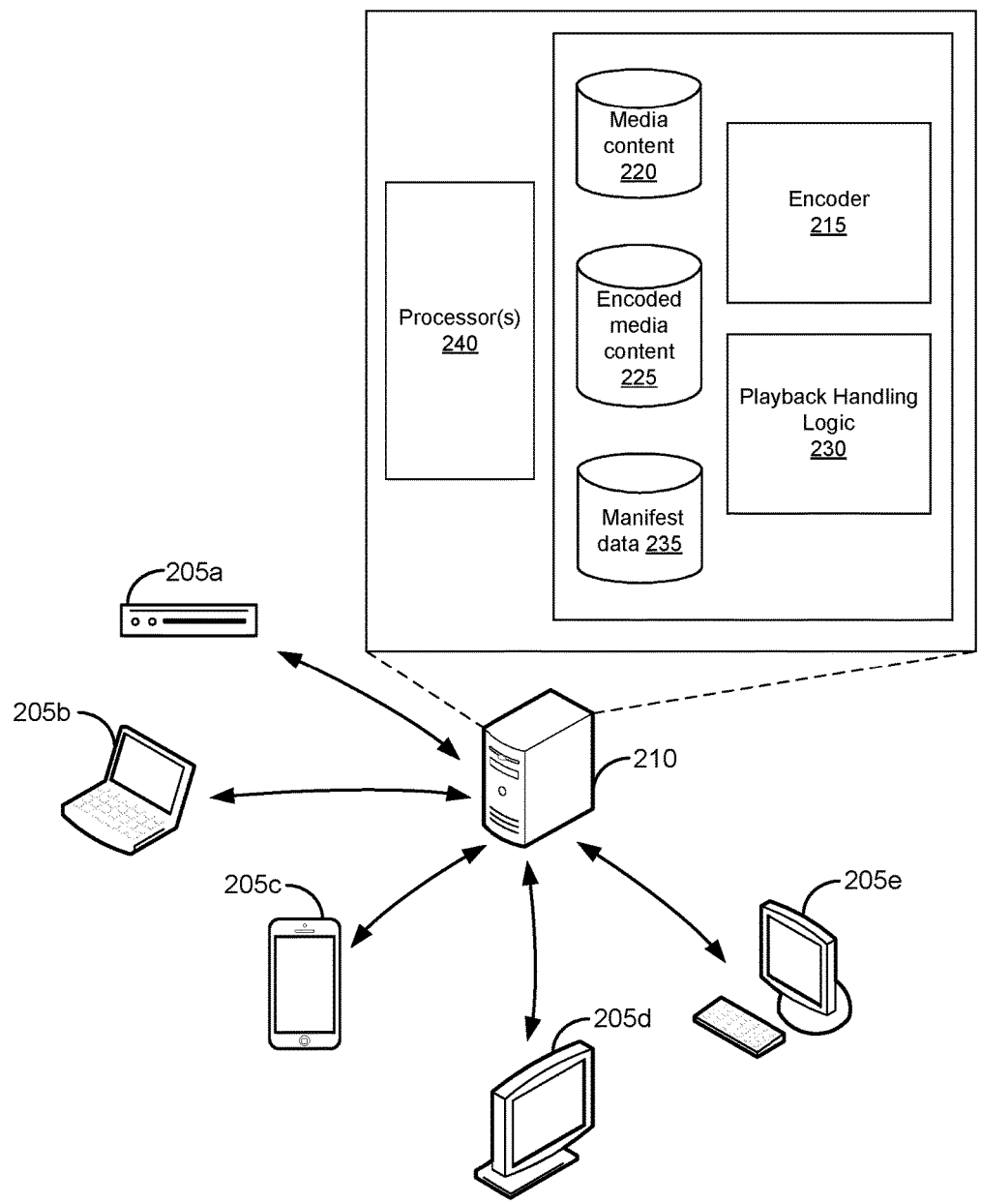
FIG. 2 illustrates an example of a computing environment for encoding media content.

FIG. 2 illustrates an example of a computing environment for encoding media content. The computing environment of FIG. 2 includes media server 210 which can be used to encode and provide media content to viewer devices 205a-e. Viewer devices 205a-e can decode the encoded media content for playback on a display screen. In FIG. 2, viewer device 205a is a set-top box, viewer device 205b is a laptop computer, viewer device 205c is a smartphone, viewer device 205d is a television, and viewer device 205e is a desktop computer. However, related functionality may also be implemented within tablets, wearable devices, virtual or augmented reality headsets, video game consoles, etc.

Media server 210 can conform to any of a wide variety of architectures and its functionality may be implemented by a variety of servers. For example, one server might encode media content and the encoded media content might be provided to another server, for example, belonging to a content delivery network (CDN). As such, the functionality and components of media server 210 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the encoding and delivery of media content and data related to the media content, including content providers, internet service providers (ISPs), providers of content delivery networks (CDNs), etc. The functionality described herein also may be implemented by one or more different entities. For example, the functionality to provide playback of media content can be integrated into a video player or software client under control of one entity (e.g., on viewer devices 205a-e), integrated into a separate app from another entity, implemented in an edge server or content server of a CDN, a server of an ISP, etc.

It should be noted that, despite references to particular computing paradigms and software tools herein, the computer program instructions on which various implementations disclosed herein are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

In FIG. 2, media server 210 can include various types of logic used to implement encoder 215 to encode media content stored in media content 220 and store encoded media content in memory such as encoded media content 225, as well as playback handling logic 230 to provide requested manifest files from manifest data 235 to viewer devices 205a-e so that they can request the encoded media content for playback. Media server 210 can include one or more processors 240, memory, and other hardware components to encode media content and provide the encoded media content to viewer devices 205a-e. For example, processors 240 can execute stored instructions in memory of media server 210 to implement encoding techniques disclosed herein.

Viewer devices 205a-e can also include various types of logic used to implement a decoder to decode the encoded media content received from media server 210 and store the decoded media, as well as playback handling logic to request manifest files and store the manifest files, and request fragments of the encoded media content based on the manifest files. Viewer devices 205a-e can include one or more processors, memory, and other hardware components to request and decode the encoded media content provided by media server 210. For example, the processors of viewer devices 205a-e can execute stored instructions in memory of the corresponding viewer device to implement decoding techniques based on the encoding techniques disclosed herein.

Figure 3:
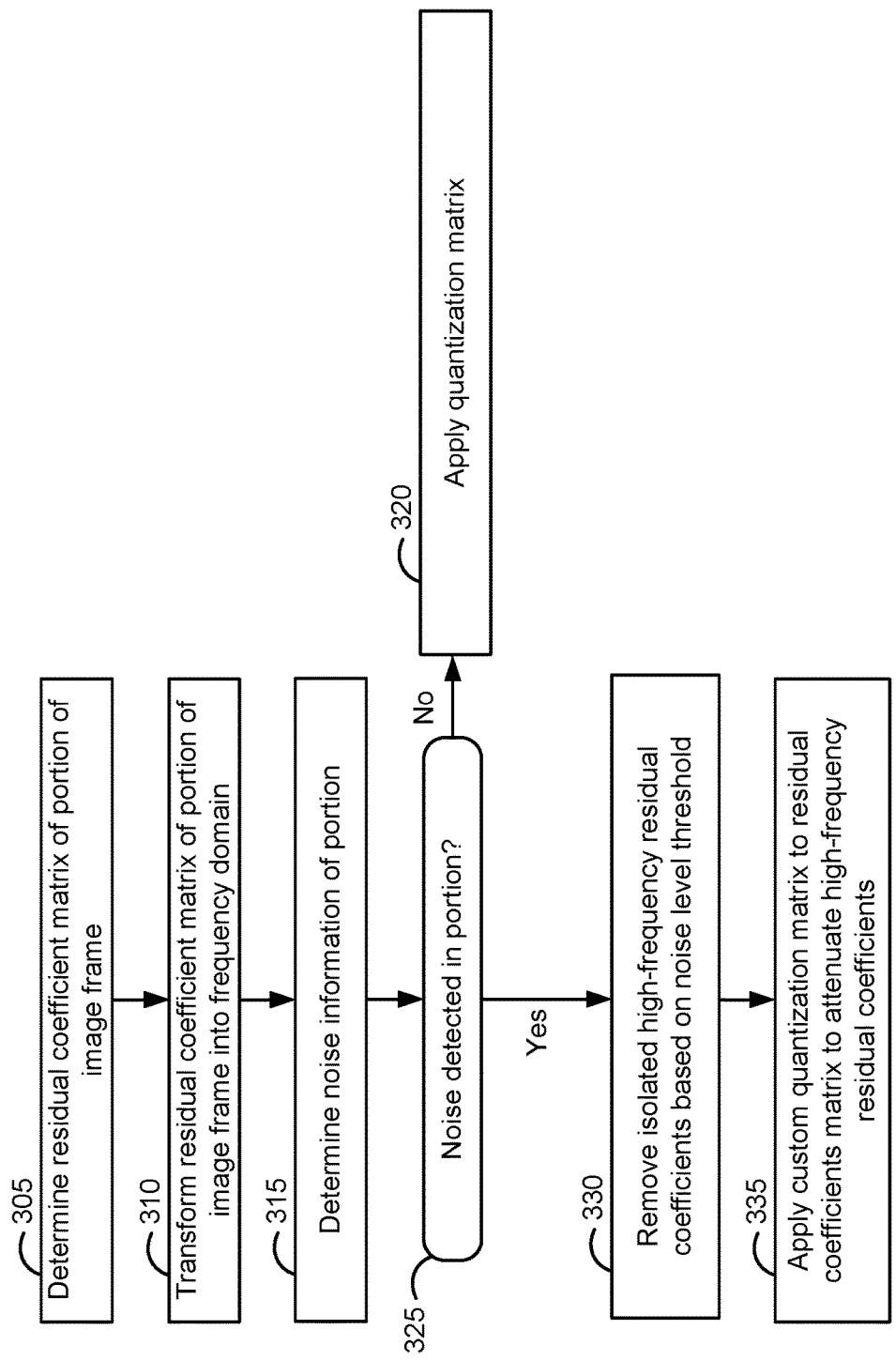
FIG. 3 is a flowchart illustrating an example of encoding media content.

A specific implementation will now be described with reference to FIG. 1, the computing environment of FIG. 2, the flow diagram of FIG. 3, and the examples of FIGS. 4 and 5. In FIG. 3, encoder 215 of media server 210 selects a portion of an image frame and determines its residual coefficients in a matrix corresponding to the size of the selected portion (305).

Figure 4:
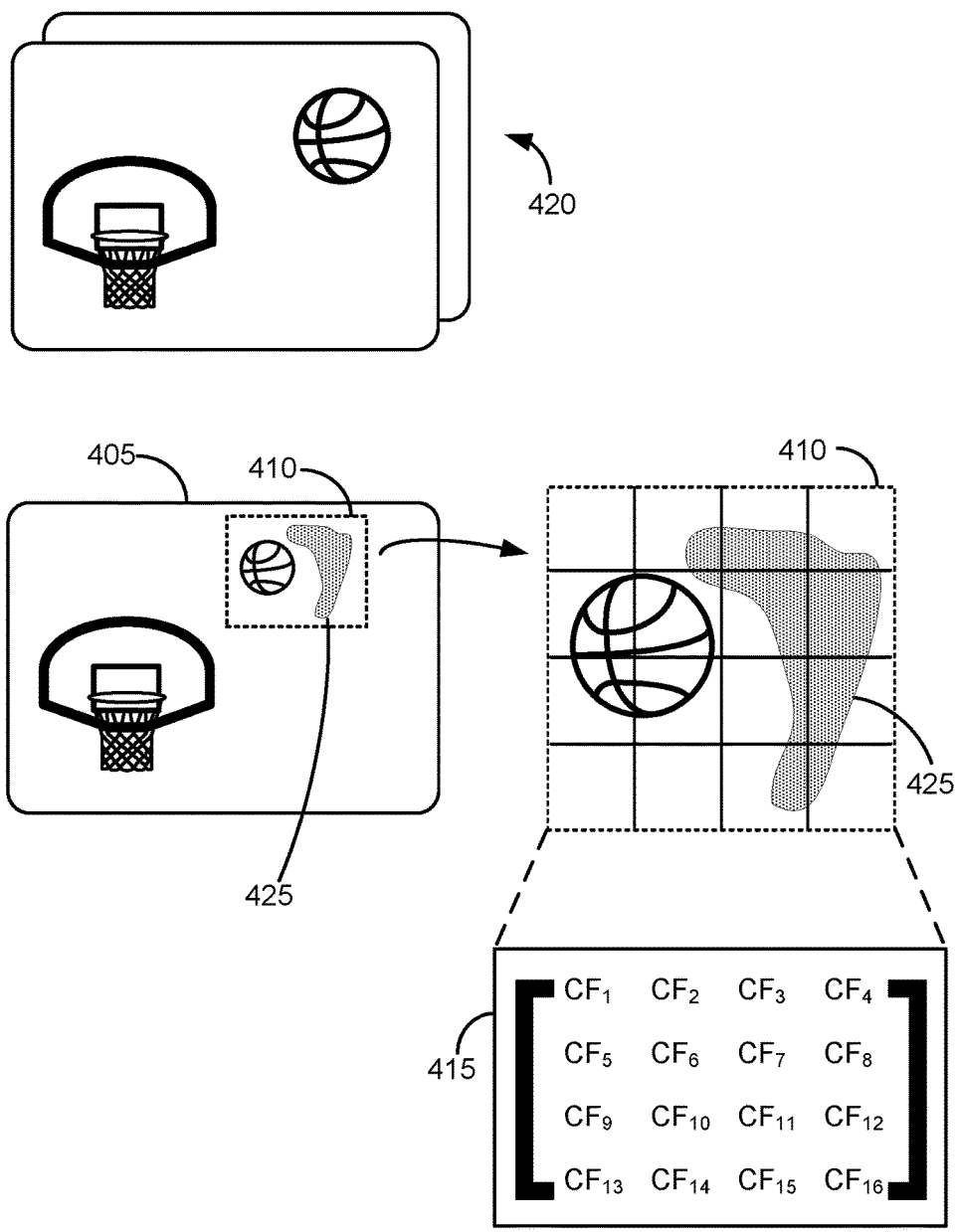
FIG. 4 illustrates an example of determining a residual coefficient matrix of a portion of an image frame.

FIG. 4 illustrates an example of determining a residual coefficient matrix of a portion of an image frame. In some standards such as HEVC/H.265, an image frame (e.g., target image frame 405 in FIG. 4) is segmented into coding tree units (CTUs) which can be further partitioned into coding units (CUs) for different portions of the image frame. The residual coefficients for a portion of an image frame are determined for each CU. For example, portion 410 of target image frame 405 corresponds to a CU in a simplified example. Different CUs in the image frame can be different sizes, for example, some might be a 4×4 block of pixels, some might be 8×8 pixels, and so forth up to 64×64 pixels. By comparing portion 410 of target image frame 405 to one or more corresponding portions of reference frames 420 (e.g., frames in the media content occurring before or after target image frame 405 during playback), differences in the image content (or data) between portion 410 and the portions in reference frames 420 can be determined and expressed as residual coefficients of a matrix with a similar size as portion 410. For example, if portion 410 is 4×4 pixels, then a 4×4 residual coefficient matrix 415 represents the differences between the portions as residual coefficients. Residual coefficient matrix 415 is used by a decoder of viewer devices 205a-e to reconstruct target image frame 405 to play back the media content.

In FIG. 4, portion 410 includes noise 425, which represents unwanted or undesirable image content. This affects the calculation of the residual coefficients, and as a result, residual coefficient matrix 415 incorporates data corresponding to the noise into the values of the residual coefficients. If noise 425 was not present, then the values of some of the residual coefficients would be different. For example, some of the high frequency residual components would be 0, as discussed below.

Residual coefficient matrix 415 in FIG. 4 expresses the residual coefficients in the spatial domain. The position within the matrix corresponds to the pixel position within portion 410. In FIG. 3, the encoder can transform the residual coefficient matrix of the portion of the target image frame into the frequency domain (310). This can be achieved by the encoder applying (e.g., multiplying) a Discrete Cosine Transform (DCT) to transform residual coefficient matrix 415 (in the spatial domain) of FIG. 4 into the frequency domain. For example, in FIG. 5, the encoder applies DCT 510 to residual coefficient matrix 415 to generate frequency domain residual coefficient matrix 505.

Noise in image and video content is often concentrated within high frequency bands. Therefore, much of the image data corresponding to noise 425 of portion 410 in FIG. 4 is within the high frequency portion (i.e., the bottom-right quadrant corresponding to a 2×2 matrix) of the 4×4 frequency domain residual coefficient matrix 505. More meaningful or natural image content, such as the basketball in portion 410, is represented by the residual coefficients in the top-left portion or quadrant (representing low frequencies) of frequency domain residual coefficient matrix 505, the top-right and bottom-left portions (representing the middle frequencies), as well as potentially the high frequency portion.

Returning to FIG. 3, noise can be detected in the portion (325). For example, in FIG. 5, noise detection 515 determines whether portion 410 in FIG. 4 includes noise by analyzing residual coefficient matrix 415 or frequency domain residual coefficient matrix 505. Noise detection 515 can be implemented by the encoder, or its analysis can be provided to the encoder by a separate noise detector. If noise detection 515 determines that portion 410 is noisy content, then it can determine or estimate a noise level for the portion. In FIG. 5, noise detection 515 indicates that the noise level of portion 410 is a value of 10.

In some standards, such as HEVC, a quantization matrix is applied to residual coefficient matrices to scale the residual coefficients as a form of compression. In HEVC, different quantization matrices are specified for different sizes of the residual coefficient matrices. If no or little noise is detected in portion 410, then a standard, or default, quantization matrix as specified by the HEVC standard can be applied by the encoder to frequency domain residual coefficient matrix 505 (320). For example, if the detected noise level is beneath a threshold detected noise level, then the default quantization matrix is applied.

By contrast, if noise is detected or is determined to be above a threshold detected noise level, then isolated high frequency residual coefficients can be removed based on a noise level threshold (330). This results in removing some noise from the portion.

Figure 5:
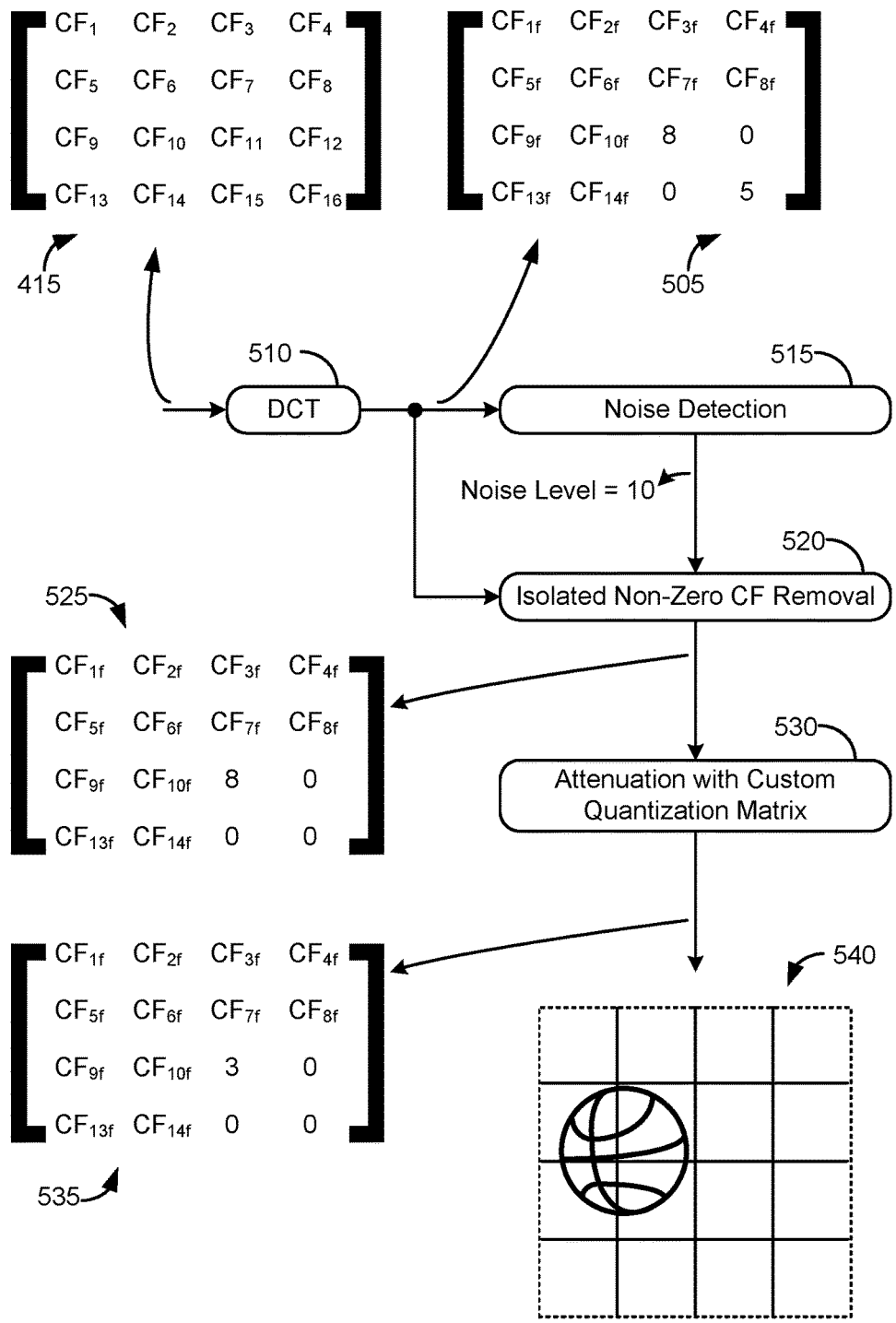
FIG. 5 illustrates an example of removing isolated non-zero high frequency residual coefficients and attenuating high frequency residual coefficients.

In FIG. 5, frequency domain residual coefficient matrix 505 includes high frequency residual coefficients of 8 and 5. The residual coefficient with the value of 5 is an isolated high frequency residual coefficient because it is separated from other non-zero residual coefficients by zero value residual coefficients. For example, if $CF_{14f}$ and $CF_{8f}$ within the middle frequency bands are non-zero values, then they along with the residual coefficient with the value of 8 in the high frequency band are separated from the residual coefficient with the value of 5 by the zero value residual coefficients within the high frequency band. Often, isolated high frequency residual coefficients are attributable to noise (e.g., noise 425 in FIG. 4) rather than meaningful image content (e.g., the basketball in portion 410 in FIG. 4). In the example of FIG. 5, the residual coefficients to the top and left of the residual coefficient with the value of 5 are determined to be 0 to identify an isolated high frequency residual coefficient. However, in other implementations, the diagonal position can also be used to determine whether a residual coefficient is isolated, multiple 0s might be identified (e.g., 2 columns and 2 rows of 0s isolating the high frequency residual coefficient), etc.

The encoder evaluates the identified isolated high frequency residual coefficient and compares it with a noise level threshold based on the noise level determined by noise detection 515. For example, if the noise level is 10, then the encoder can set a noise level threshold as being half of the noise level and then remove, or zero out (e.g., make the value 0), any isolated high frequency residual coefficients if they are within the noise level threshold range at or beneath half of the noise level threshold. For example, 5 and below (to 0 or a negative number) can be the noise level threshold range. Since 5 is half of the noise level of 10 and within the noise level threshold range, the encoder can effectively remove that noise image content by modifying the value of 5 in frequency domain residual coefficient matrix 505 to be a zero value, as in first modified frequency domain residual coefficient matrix 525. This removes some of the noise content from the high frequency portion residual coefficient matrix.

The encoder can also apply a custom quantization matrix to the residual coefficients to attenuate high frequency residual coefficients (335). This can result in reducing some noise in the portion. For example, in FIG. 5, custom quantization matrix attenuation 530 is performed by the encoder to attenuate high frequency residual coefficients that were not zeroed out with isolated non-zero residual coefficient removal 520. This can further reduce the contribution of noise accounted for by the residual coefficients. The custom quantization matrix can scale the high frequency residual coefficients differently than the standard quantization matrix used if no or little noise is detected. For example, the custom quantization matrix can attenuate, or reduce, the values of the high frequency residual coefficients more so than the standard quantization matrix such that the noise content within the residual coefficients is reduced while the residual coefficients in the low and middle frequency bands are attenuated, or quantized, similar to the standard quantization matrix.

The custom quantization matrix can scale down the remaining high frequency residual coefficients by dividing them by a number, subtracting them with a number, rescaling them within a new range, etc. such that the residual coefficients are reduced to a non-zero value. Modifying, or reducing, the residual coefficients to a non-zero value results in reducing noise, but not removing it. This can be beneficial since the values of the non-isolated residual coefficients are outside the noise level threshold range, and therefore, more care should be exercised since they are closer to the noise level. In FIG. 5, this results in second modified frequency domain residual coefficient matrix 535 in which the high frequency residual coefficient with the value of 8 being scaled down to a value of 3. When second modified frequency domain residual coefficient matrix 535 is decoded, it provides portion 540 in FIG. 5, which is similar to portion 410 in FIG. 4 but includes no or reduced noise 425.

The technique can be repeated for the CUs of target image frame 405 and encoder 215 can store an encoded bitstream in encoded media content 225 for image frames of the media content. Each application of quantization matrices for reducing and/or removal of high frequency residual coefficients (as well as any additional encoding techniques), can be stored to provide an encoded image frame for the media content that can be decoded for playback by a viewer device. Since many of the high frequency residual coefficients would either be reduced or removed, the encoded version of the media content would have less noise.

Thus, by removing or attenuating the values of the residual coefficients in the high frequency range, the contribution of noise can be reduced. This results in fewer bits being used for encoding noise, which can allow for fewer bits needed to encode portion 410 of target image frame 405 of the media content. Therefore, more bits can be spent on more meaningful image content to improve the visual quality of the playback and/or fewer bits overall can be used to encode the media content.

The custom quantization matrix to be applied can be generated based on the media content. For example, in two pass (or multi-pass) encoding, encoder 215 can analyze each CU and determine custom quantization matrices that can be applied to achieve the desirable attenuation in noise in a first pass. Several custom quantization matrices can be generated in the first pass and can be selected in a second pass to be applied to the residual coefficient matrices based on the distribution and values of the high frequency residual coefficients. In some implementations, the custom quantization matrices can be the same size as the residual coefficient matrices. Multiple custom quantization matrices of the same size can be generated with different values for its coefficients such that they attenuate the high frequency residual coefficients differently based on how much noise is desirable to reduce.

In the HEVC/H.265 standard, a residual coefficient matrix is transformed into the frequency domain and multiplied with a quantization matrix, as previously described. Additionally, a quantization parameter is also applied to (e.g., multiplied or divided with) the residual coefficient matrix to provide an additional and uniform scaling to each of the residual coefficients.

As previously discussed, in standards such as HEVC/H.265, an image frame is segmented into coding tree units (CTUs) which can be further partitioned into coding units (CUs). The residual coefficients for a portion of an image frame are determined for each CU. Different CUs in the image frame can be different sizes. During the encoding process, quantization parameters are applied to the residual coefficients of each portion, along with the quantization matrices as previously discussed. However, if a much higher or lower quantization parameter is applied to the set of residual coefficients of one CU than to the set of residual coefficients of another CU, then the quality of the different portions of the image frame can significantly vary. This results in a noticeable flickering across the image frame when the media content is decoded and played back. This can be especially noticeable when the media content includes scenes with some portions having noisy content and some portions not having noisy content. As an example, a scene with characters watching old, grainy video on a television can result in some portions of the scene portraying the old, grainy video being noisy, but the rest of the portions of the scene being relatively clear of noise.

Figure 6:
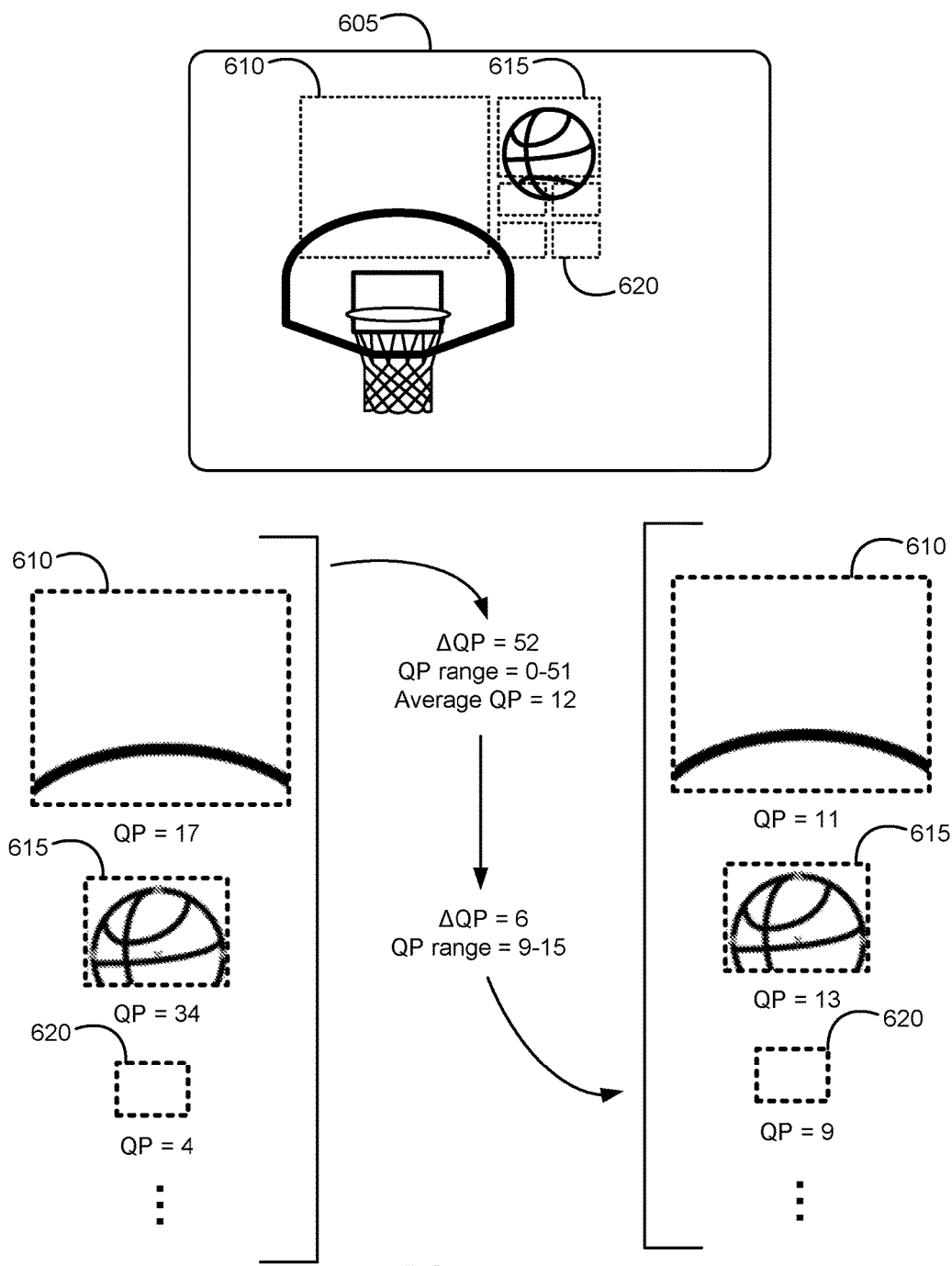
FIG. 6 illustrates an example of adjusting quantization parameters.
Figure 7:
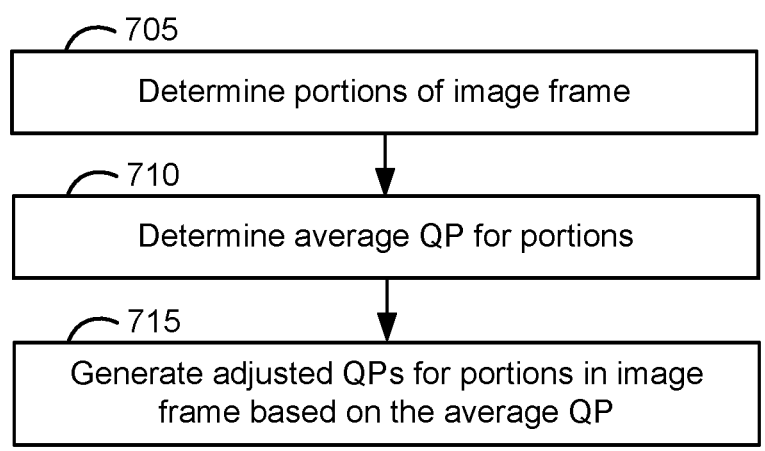
FIG. 7 is a flowchart illustrating an example of adjusting quantization parameters.

FIG. 6 illustrates an example of adjusting quantization parameters. FIG. 7 is a flowchart illustrating an example of adjusting quantization parameters. FIGS. 6 and 7 provide an implementation in which the quantization parameters to be applied can be adjusted to reduce the variance among them, and therefore, reduce the flickering due to differences in quality of the portions.

In FIG. 7, portions of an image frame can be determined (705). For example, in FIG. 6, encoder 215 partitions target image frame 605 into portions 610, 615, 620, and so forth. Each of the different portions correspond to a different CU, and therefore, different residual coefficient matrices.

Under the HEVC standard, quantization parameters range from 0 to 51. A quantization parameter difference of 6 between portions results in the portion associated with the higher quantization parameter doubling its bits and therefore doubling its quality compared to the portion associated with the lower quantization parameter. In FIG. 7, the average quantization parameter for the portions can be determined (710) using HEVC standard's scale of 0 to 51.

Higher quantization parameters can be applied (e.g., multiplied, divided, etc.) to difficult to encode portions than easier to encode portions. For example, portions portraying a significant amount of varying image content, such as textures, hair, faces, etc. might be classified as difficult to encode because those portions would need many bits to be able to encode the portion at an acceptable visual quality. By contrast, portions portraying an insignificant amount of varying image content, such as a flat wall or background, might be classified as easy to encode because those portions would not need many bits to be able to encode the portions to an acceptable visual quality. As a result, portions can be assigned a quantization parameter from 0 to 51 based on the difficulty of encoding the portions. In FIG. 6, this results in portion 610 having a quantization parameter of 17, portion 615 having a quantization parameter of 34, and portion 620 having a quantization parameter of 4. Portion 615 has a higher quantization parameter because it includes a significant amount of meaningful image content by portraying a large portion of the basketball from target image frame 605. In order to encode portion 615 to an acceptable visual quality level, a significant number of bits might need to be used to properly display the textures and details of the basketball when portion 615 is decoded for playback. Portion 610 has a lower quantization parameter because it includes less detailed image content than frame 605, and therefore, would need less bits to encode. Likewise, portion 620 also has a lower quantization parameter because it corresponds to flat background detail. Other portions have their quantization parameters in the range of 0 to 51 so that they are within that 52 value range.

Encoder 215 can determine a representative quantization parameter for target image frame 605, for example, the average quantization parameter of the portions across target image frame 605. In some implementations, the quantization parameter for a portion can be weighted based on its size. For example, since portion 610 is four times larger (e.g., four times as many pixels) than portion 615, the quantization parameter of portion 610 might contribute "more" to the average quantization parameter than the quantization parameter for portion 615. The quantization parameters can be scaled by multiplying or dividing them based on whether their corresponding portion is larger or smaller than a reference portion. As an example, portion 615 might be an 8×8 portion and its quantization parameter of 34. Portion 610 is a 16×16 portion that is four times larger than portion 615, and therefore, its quantization parameter of 17 is scaled to a value of 68 (or maxed out at 51 as that is the top of the range) when determining the average quantization parameter for the portions of target image frame 605.

As a result, an average quantization parameter based on all of the portions of target image frame 605 is determined using the 0-51 quantization parameter scale under HEVC. In the example of FIG. 6, an average quantization parameter for target image frame 605 is 12 and the range from the highest and lowest quantization parameters for the portions is 52 since the HEVC scale is from 0 to 51. In some implementations, the average quantization parameter can be calculated in a first pass of the encoding process, as previously discussed. Next, in the second pass of the encoding process, the quantization parameters to be applied can be determined, as discussed below.

Encoder 215 can adjust the quantization parameters to be applied to the portions in target image frame 605 based on the average quantization parameter (715). For example, in FIG. 6, the quantization parameters for each of the portions can be within an adjusted quantization parameter range of +/−3 of the average quantization parameter. That is, since the average quantization parameter is 12, the lowest quantization parameter that can be assigned to a portion would be 9 and the highest would be 15. This limits the variance between quantization parameters to 6, and therefore, the highest quality portion can at most be twice as high of a quality than the lowest quality portion. The quantization parameter assigned to the portions under the 0-51 scale can be mapped or scaled proportionally to fit within the 9-15 scale. For example, if a portion is originally determined to have a quantization parameter of 26 (within the middle of the 0-51 range), that can be mapped to a quantization parameter of 12 (within the middle of the adjusted quantization parameter range of 9-15) by encoder 215. As another example, a quantization parameter of 50 might be mapped to an adjusted quantization parameter of 15. The average quantization parameter can be at the center or midpoint of the 9-15 scale (or range).

In the example of FIG. 6, a quantization parameter of 11 is to be applied to portion 610, a quantization parameter of 13 is to be applied to portion 615, and a quantization parameter of 9 is to be applied to portion 620. Since each of the portions corresponds to a quantization parameter within the range of 9-12, the flickering due to the variance of quantization parameters can be reduced, increasing the visual quality of the playback.

In some implementations, the adjusted quantization parameter range can be changed, for example, to increase or decrease the range from within +/−3 of the average quantization parameter. For example, if a large percentage of portions have quantization parameters are determined by the encoder to be concentrated at the lower end of the 0-51 quantization parameter scale, then the adjusted quantization parameter scale might range from −4 from the average to +3 from the average. That is, an endpoint of the adjusted quantization parameter scale can be adjusted if a certain percentage of quantization parameters using the larger 0-51 HEVC scale are below a threshold quantization parameter.

By using an adjusted quantization parameter range of +/−3 of the average quantization parameter, this limits the variance between the adjusted quantization parameters to a value of 6 between the lowest and highest values. This constrains the difference in quality between the lowest quality portion and the highest quality portion by a factor of 2. That is, the highest quality portion would at most be two times higher in quality (using a corresponding number of bits to encode) than the lowest quality portion, and therefore, reduces noticeable flickering across target image frame 605.

As previously discussed, the quantization parameter can be applied to the residual coefficient matrix. For example, the residual coefficient matrix corresponding to portion 610 can be multiplied by a quantization matrix and the adjusted quantization parameter during the encoding process.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer implemented method comprising:
   determining a first residual coefficient matrix representing differences between a first portion corresponding to a first coding unit (CU) of an image frame of media content and portions of one or more corresponding reference frames of the media content;
   transforming the first residual coefficient matrix from a spatial domain to a frequency domain with a Discrete Cosine Transform (DCT) to generate a frequency domain first residual coefficient matrix;
   determining noise information indicating a first noise level corresponding to the first portion associated with the frequency domain first residual coefficient matrix;
   removing noise associated with isolated residual coefficients in a high frequency portion of the frequency domain first residual coefficient matrix based on the first noise level to reduce noise in the first portion, each isolated residual coefficient being adjacent to only zero value residual coefficients and separated from non-zero residual coefficients by the zero value residual coefficients in the frequency domain first residual coefficient matrix;
   reducing noise by applying a first quantization matrix to the frequency domain first residual coefficient matrix resulting in a quantized first residual coefficient matrix to attenuate non-isolated residual coefficients in the high frequency portion of the frequency domain first residual coefficient matrix, the non-isolated residual coefficients being adjacent to one or more non-zero value residual coefficients in the frequency domain first residual coefficient matrix; and
   generating an encoded version of the media content using the quantized first residual coefficient matrix.

2. The computer implemented method of claim 1, further comprising:
   determining a second residual coefficient matrix representing differences between a second portion corresponding to a second CU of the image frame of media content and portions of one or more corresponding reference frames of the media content;
   transforming the second residual coefficient matrix from a spatial domain to a frequency domain to generate a frequency domain second residual coefficient matrix;
   determining noise information indicating a second noise level corresponding to the second portion associated with the frequency domain second residual coefficient matrix;
   determining that the second noise level corresponds to no noise being within the second portion or little noise being within the second portion; and
   applying a second quantization matrix to the frequency domain second residual coefficient matrix to attenuate the residual coefficients in a high frequency portion of the frequency domain second residual coefficient matrix, the second quantization matrix attenuating residual coefficients less than the first quantization matrix, and the second quantization matrix applied based on the second noise level.

3. The computer implemented method of claim 2, wherein removing noise associated with the isolated residual coefficients includes determining that the first noise level is within of a threshold detected noise level range, and the second noise level is outside the threshold detected noise level range.

4. The computer implemented method of claim 1, wherein attenuating the residual coefficients includes reducing values of the residual coefficients to non-zero values, and removing the isolated residual coefficients includes reducing values of the isolated residual coefficients to zero values.

5. A system comprising:
   one or more processors and memory configured to:
   remove noise associated with isolated residual coefficients in a high frequency range of a first residual coefficient matrix corresponding to a first portion of an image frame of media content, each isolated residual coefficient being adjacent to only zero value residual coefficients and separated from other non-zero residual coefficients by the zero value residual coefficients in the first residual coefficient matrix; and
   reduce noise associated with non-isolated residual coefficients in the high frequency range of the first residual coefficient matrix corresponding to the first portion of the image frame, the non-isolated residual coefficients being adjacent to one or more non-zero value residual coefficients in the first residual coefficient matrix.

6. The system of claim 5, wherein removing noise associated with the isolated residual data includes modifying values of the isolated residual coefficients to be zero values, and reducing noise associated with the non-isolated residual coefficients includes applying a first quantization matrix to the first residual coefficient matrix to reduce values of the non-isolated residual coefficients to non-zero values.

7. The system of claim 6, wherein the one or more processors and memory are further configured to:
   apply a second quantization matrix to a second residual coefficient matrix to reduce noise in a high frequency portion of a second residual coefficient matrix associated with a second portion of the image frame, the second quantization matrix reducing residual coefficients less than the first quantization matrix.

8. The system of claim 7, wherein the one or more processors and memory are further configured to:
   determine that noise of the first portion is at a first noise level within a threshold detected noise level range; and
   determine that noise of the second portion is at a second noise level outside the threshold detected noise level range, being outside the threshold detected noise level range indicating that the second portion includes less noise than the first portion.

9. The system of claim 5, wherein the one or more processors and memory are further configured to:
   determine a noise level of the first portion associated with the first residual coefficient matrix;
   determine a threshold noise level range based on the noise level, wherein values of the isolated residual coefficients are within the threshold noise level range, and values of the non-isolated residual coefficients are outside the threshold noise level range.

10. The system of claim 5, wherein the first portion corresponds to a first coding unit (CU) of the image frame.

11. The system of claim 5, wherein the one or more processors and memory are further configured to:
    generate an encoded version of the media content using the first residual coefficient matrix based on the removed and reduced noise.

12. A computer program product comprising one or more non-transitory computer-readable media having computer instructions stored therein, the computer program instructions being configured such that, when executed by one or more computing devices, the computer program instructions cause the one or more computing devices to:
    remove noise associated with isolated residual coefficients in a high frequency range of a first residual coefficient matrix corresponding to a first portion of an image frame of media content each isolated residual coefficient being adjacent to only zero value residual coefficients and separated from other non-zero residual coefficients by the zero value residual coefficients in the first residual coefficient matrix; and reduce noise associated with non-isolated residual coefficients in the high frequency range of the first residual coefficient matrix corresponding to the first portion of the image frame, the non-isolated residual coefficients being adjacent to one or more non-zero value residual coefficients in the first residual coefficient matrix.

13. The computer program product of claim 12, wherein removing noise associated with the isolated residual data includes modifying values of the isolated residual coefficients to be zero values, and modifying the non-isolated residual coefficients includes applying a first quantization matrix to reduce values of the non-isolated residual coefficients to non-zero values.

14. The computer program product of claim 13, the computer program instructions further to cause the one or more computing devices to:

apply a second quantization matrix to a second residual coefficient matrix to reduce noise in a high frequency portion of a second residual coefficient matrix associated with a second portion of the image frame, the second quantization matrix reducing residual coefficients less than the first quantization matrix.

15. The computer program product of claim 14, the computer program instructions further to cause the one or more computing devices to:

determine that noise of the first portion is at a first noise level within a threshold detected noise level range; and determine that noise of the second portion is at a second noise level outside the threshold detected noise level range, being outside the threshold detected noise level range indicating that the second portion includes less noise than the first portion.

16. The computer program product of claim 12, the computer program instructions further to cause the one or more computing devices to:

determine a noise level of the first portion associated with the first residual coefficient matrix;

determine a threshold noise level range based on the noise level, wherein values of the isolated residual coefficients are within the threshold noise level range, and values of the non-isolated residual coefficients are outside the threshold noise level range.

17. The computer program product of claim 12, wherein the first portion corresponds to a first coding unit (CU) of the image frame.

18. The computer program product of claim 12, wherein the one or more processors and memory are further configured to:

generate an encoded version of the media content using the first residual coefficient matrix based on the removed and reduced noise.

* * * * *